Sept. 7, 1926.  1,598,606
G. S. DEY
ILLUMINATING DEVICE FOR OPHTHALMOLOGICAL APPARATUS
Filed August 21, 1924   2 Sheets-Sheet 2
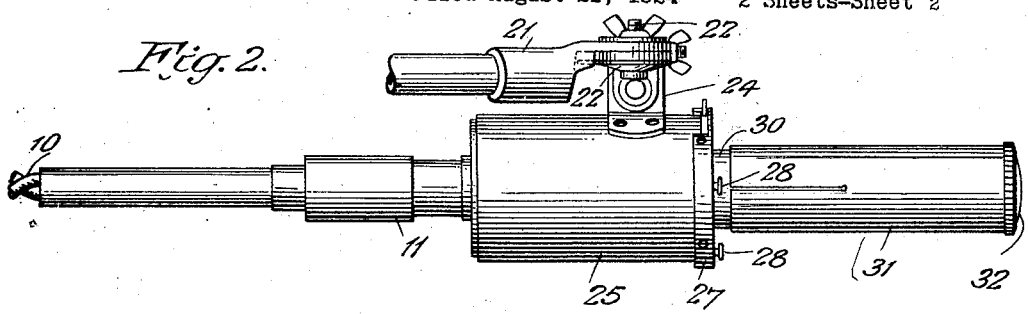
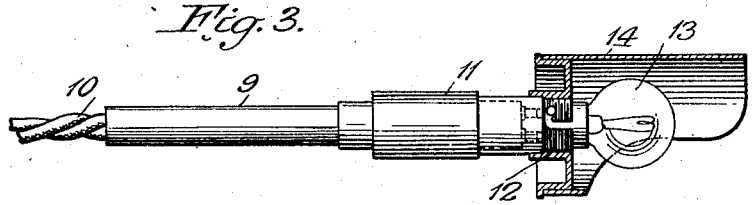
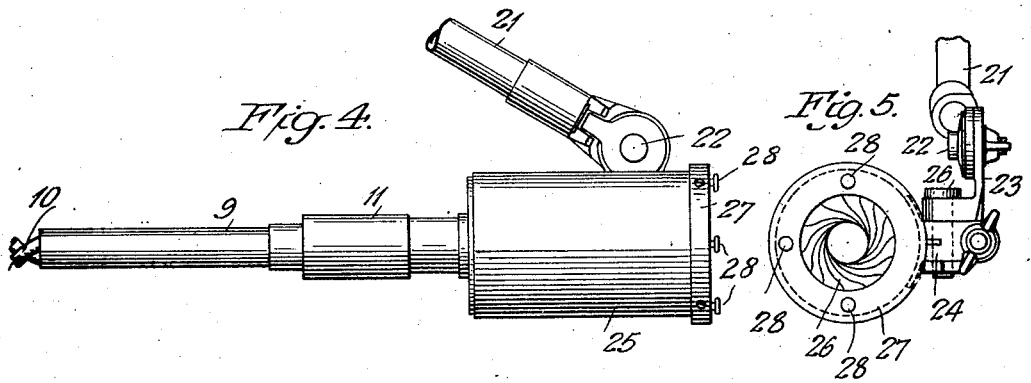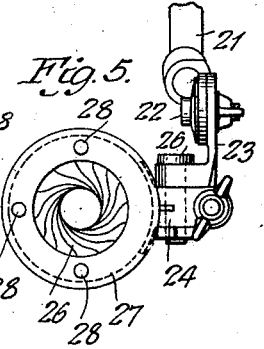
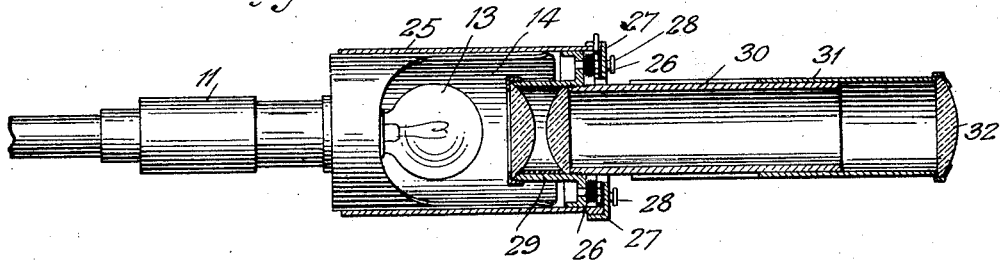
INVENTOR.
GILBERT S. DEY.
BY
*Stockbridge & Borst*
ATTORNEYS Patented Sept. 7, 1926.

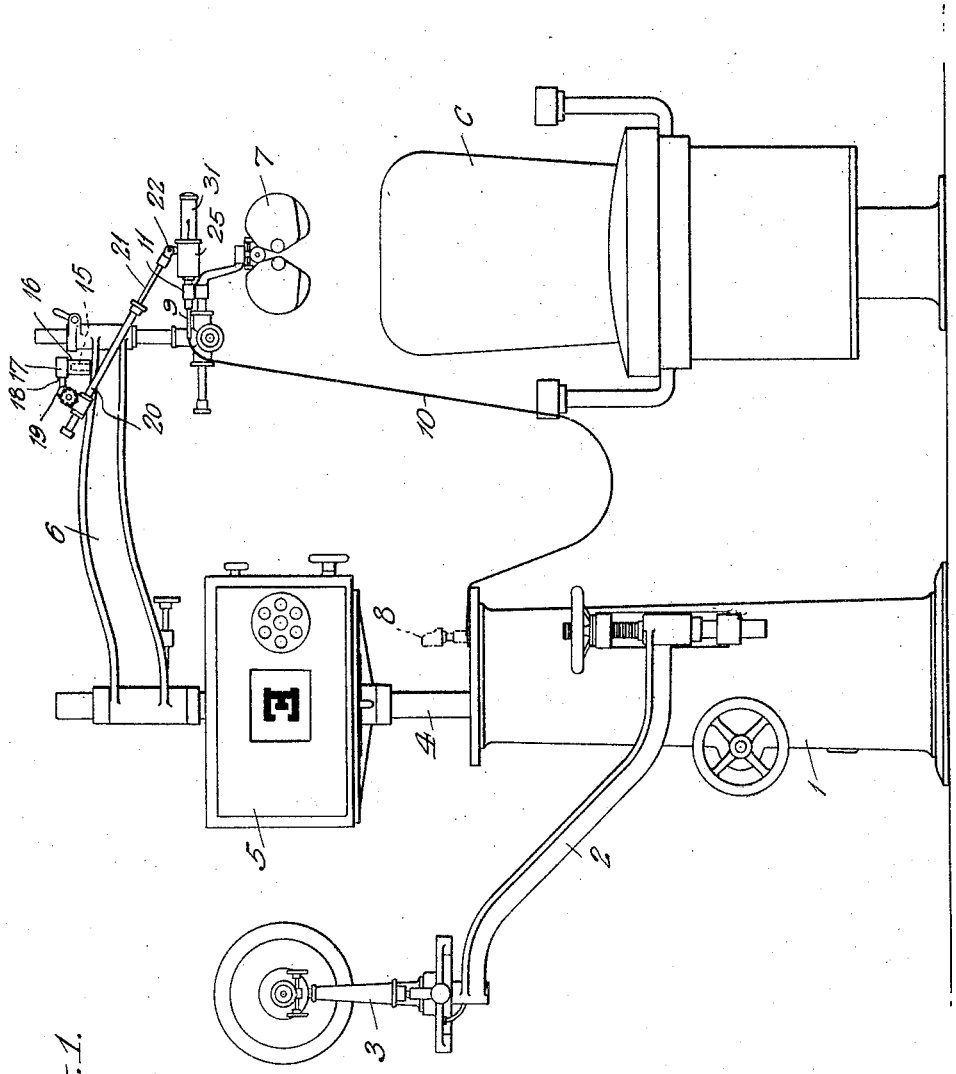

1,598,606

UNITED STATES PATENT OFFICE.

GILBERT S. DEY, OF MOUNT VERNON, NEW YORK, ASSIGNOR TO GENERAL OPTICAL COMPANY, INC., A CORPORATION OF NEW YORK.

ILLUMINATING DEVICE FOR OPHTHALMOLOGICAL APPARATUS.

Application filed August 21, 1924. Serial No. 733,249.

My invention relates particularly to illuminating or lighting means for use in conjunction with ophthalmological apparatus, and supplies various forms and conditions of light such as an oculist requires in connection with his professional work. This is accomplished by my invention with a unitary device and a single source of illumination. I shall explain my invention in connection with an ophthalmological apparatus such as is shown in the copending application for patent of Hans Clement and myself, Serial No. 673,728, filed November 9, 1923, which will serve to illustrate the manner in which embodiments of my invention fit into the complete instrument equipment of an oculist and cooperate therewith, although, as will be understood embodiments of my invention constitute a complete and useful convertible lighting equipment independent of the associated diagnostic instruments.

Since optical examinations are as a rule conducted in a dark room from which all extraneous light is excluded, the oculist has need for a portable light of some kind which he can use in locating instruments or for other temporary purpose and which he can readily turn on and off. Such a light is sometimes termed a tracer light and is frequently supplied by a small electric lamp the socket of which is on the end of a cable plugged into a receptacle or other outlet.

The oculist also has numerous uses for light sources which may be directed at will and which are subject to various kinds of control. For example with reflecting retinoscopes he requires a light which can be stopped down to any desired degree. A light of proper intensity and direction is needed to illuminate the observation charts used in refracting. Also a concentrated light is often needed, as, for example, to illuminate the eye of a patient for the removal of a foreign body. While there are many other uses which an optician will have for a suitable illuminant, these examples will suffice to illustrate the purpose and utility of my invention, which contemplates an apparatus by means of which a single source of light can be rendered available for the several uses.

In accordance with my invention, I provide a bracket which is suitably mounted with respect to the patients' chair, for example on the stand or support which holds the other diagnostic instruments and apparatus, and which is universally jointed so that its free end can be directed at any angle and can be brought to any position within the limits of the length of the bracket. On the free end is a sleeve of opaque material which is open at one end and has a suitable adjustable shutter, such as an iris diaphragm at the other. The inner tube of a telescopic objective or focusing lens holder enters that end of the sleeve when the shutter is open and is removably secured therein, permissibly extending within the plane of the shutter so as to incapacitate the shutter so long as the lens holder is in the sleeve.

In the preferred form the inner tube of the objective lens holder screws into a condensing lens holder which is secured in the sleeve just back of the shutter.

The single source of light may be a portable electric light, the cable of which is attachable to any convenient outlet or terminals, and which will serve as the tracer light. On the socket of this light is a suitable reflecting shield which partially surrounds the lamp and is of such size and shape as to fit snugly in the sleeve when entered into the open end thereof.

My invention comprehends other features and details of construction as will hereinafter more fully appear. I shall now describe the illustrated embodiment of my invention and shall thereafter point out my invention in claims.

Fig. 1 is an elevation of an ophthalmological standard with apparatus interchangeably supported thereon in a unitary arrangement, and showing one embodiment of my invention applied thereto.

Fig. 2 is an elevation of the complete illuminating device embodying my invention, as illustrated in Fig. 1.

Fig. 3 is an elevation of the tracer lamp with the reflecting shield in section.

Fig. 4 is an elevation of the lamp and sleeve assembled with the objective lens holder removed, the parts being shown in the position turned axially 90° from that of Fig. 2.

Fig. 5 is an end elevation of the parts shown in Fig. 4.

Fig. 6 is a sectional elevation of the complete assembly shown in Fig. 2.

The ophthalmological apparatus shown in Fig. 1 corresponds with that of the said copending application of Hans Clement and myself, Serial No. 673,728. This apparatus comprises a base cabinet 1 having a vertically adjustable swinging arm 2 thereon on which is supported an ophthalmometer 3. An adjustable vertical standard 4 rises out of the cabinet and has on it an optical test chart 5 and a radial swinging arm 6 on the outer end of which is supported a vertically adjustable phoro-optometer or refractor 7. A patients' chair C is so disposed with relation to the apparatus that the ophthalmometer and the refractor may be successively brought before the eyes of a patient seated in the chair.

Within the cabinet 1 are several outlets or electric terminals for the cables of various small diagnostic instruments (not shown) which are disposed in jacks in the top of the cabinet when not in use. In accordance with my invention, I also provide a tracer lamp and a jack therefor in the top of the cabinet together with a cable for attachment to the terminals within the cabinet. This lamp is shown by dotted lines in Fig. 1 in its position in the jack in the top of the cabinet, and is there indicated by the reference numeral 8. This lamp is shown in detail in Fig. 3 and consists of a hollow stem 9 through which the cable 10 enters and a lamp base 11 terminating in a suitable socket 12 for an electric lamp 13. This socket is externally screw threaded and a reflecting shield member 14 has an internally screw threaded hub or neck which screws on the socket. This reflecting shield member is shown as approximating a scoop shape, that is, it is cylindrical in shape, open at its outer end and is cut away on one side from its outer end to near its rear end. The operator can thus direct the light away from him at will, and the shield 14 will prevent his vision from being impaired by direct rays from the lamp.

As explained in our copending application Serial No. 673,728, the cables for the several small instruments for which jacks are provided in the top of the cabinet have suitable retractile means for drawing them into the cabinet when the instrument is returned to its place, while at the same time permitting the ready withdrawal of the instrument and its cable. The cable 10 will preferably have similar means (not shown).

On the upper side of the outer end of the arm 6 is provided a suitable round boss 15 which serves as a bearing for the universally jointed bracket, above referred to. This bracket has on the end of one arm a socket 16 which fits over the bearing boss 15, thereby permitting free adjustment of the arm on this vertical axis. This arm 17, which is shown only in end view in Fig. 1 has at its other end a laterally extending pin 18 which is pivoted to a coupling member 19 on an axis at right angles to the axis of the socket 16. This coupling member 19 is clamped to a hollow tubular arm 20 within which rotatably telescopes an extension rod 21. The outer end of this rod 21 is pivoted by a screw 22 to a short arm 23, which arm in turn is pivoted to a boss 24 on the side of a cylindrical sleeve 25 by a pivot screw 26, the axis of which is disposed at right angles to that of the pivot screw 22. It will therefore be seen that the bracket is so articulated that the sleeve 25 can be universally adjusted to any position within the radius of a full extension of the arms 20 and 21, and may be pointed in any direction.

This tube 25 is of cylindrical shape and is open at its rear end and is of such a size as to receive the reflecting shield or shell 14 with a rather snug sliding fit, the lamp being thus removably supported by the sleeve 25, as shown in Figs. 1, 2 and 6. The sleeve is composed of any suitable material and is preferably black in color so as to be non-reflecting to the light rays.

At the outer end of this tube 25 is an iris diaphragm 26 of usual construction, the cap 27 of which fits over the end of the sleeve and is secured thereto, as by screws, and is suitably calibrated throughout the range of the operating handle in the usual manner. On the face of this iris diaphragm is also provided three projecting studs 28 for holding a trial case lens, which may be a permanent diaphragm, a shaped diaphragm, a frosted disc, a grayed disc, or any color desirable to lend itself to various tests required. Within this end of the sleeve and just back of the diaphragm is secured a condensing lens holder 29, which is shown as a metallic tube having an internal diameter somewhat smaller than the opening of the diaphragm 26 in its fully opened position, and is supported in axial relation to the sleeve by means of a flanged portion on its outer end which fits within the tube and which flange has in it the pivots for the plates of the iris diaphragm, as shown in Fig. 6. The outer portion of this condensing lens holder 29 beyond the condensing lenses is internally screw threaded, and is adapted to receive the screw threaded end of an inner tube 30 of a telescopic objective lens holder. The other member of this objective lens holder is an outer tube 31 which telescopes over the inner tube 30 and has an objective lens 32 in its outer end.

The device as above described is adapted for various uses. When not in use the lamp 8 will be disposed in its jack in top of the cabinet 1, as shown in dotted lines in Fig. 1, the insertion of the lamp in the jack serving to break the electrical circuit through means which are not shown but which are described in the said copending application Serial No. 673,728. The lamp is available for use either as a tracer light independently of the apparatus supported on the universally jointed bracket, or it may be inserted in the sleeve 25, which is the position shown in full lines in Fig. 1, and as it is also shown in Figs. 2, 4 and 6. If the objective lens holder be removed, as shown in Figs. 4 and 5, the rays of light from the lamp 13 will be rendered parallel by the condensing lens, and a uniform field of light variable in diameter by the graduated iris diaphragm from 5 to 25 mm. through the shutter end of the sleeve is thus available. This will have many uses, for instance, in connection with a reflecting retinoscope as above mentioned. It may also be used, for example, to illuminate a chart (not shown) which is used in connection with the refractor 7. This variable beam may also be transmitted through the trial case lens in the holders 28 for such use as may be desired.

If it is desired to focus a strong light at any point, as, for instance, in the eye of a patient to assist in the removal of a foreign body, the objective lens holder may be screwed in to its place, as shown in Figs. 2 and 6, the device being brought around so as to direct the light into the eye of a patient and the objective lens being adjusted to bring the light to a proper focus. Since both the lamp and the objective are slidable relative to the condensers, a very effective means of controlling the light beam is provided.

When the tracer lamp is removed from the sleeve and retrieved to the panel in the cabinet, the remaining parts are small and may be easily swung around out of the way, as, for instance, to the position shown in Fig. 1 and it will be noted that there are no dangling cords under such condition.

The refractor 7 will be lifted up on the horizontal axis and thus gotten out of the way when it is desired to use the device as a foreign body light.

It is obvious that various changes may be made in the details and arrangements of parts herein described and illustrated for the purpose of explaining the nature of the invention, by those skilled in the art within the principle and scope of the invention as expressed in the appended claims.

I claim:—

1. An illuminating device for ophthalmological apparatus comprising the combination of a universally jointed bracket having suitable mounting means at one end, a sleeve on the free end of the bracket to swing therewith and open at one end, an adjustable shutter in the other end of the sleeve, an electric lamp socket and a cable therefor adapted for connection to electrical terminals, and a reflecting shield carried by the lamp socket and shaped to fit into the open end of the sleeve and thus be removably supported thereby so as to be inserted therein or removed therefrom at will, whereby when the device is not in use the lamp socket may be readily removed so that its cable is out of the way and the sleeve may be swung out of the way by means of its supporting bracket.

2. An illuminating device for ophthalmological apparatus comprising the combination of a universally jointed bracket having suitable mounting means at one end, a sleeve on the free end of the bracket to swing therewith and open at one end, an adjustable shutter in the other end of the sleeve, a focusing member removably secured in the said other end of the sleeve with its inner end within the opening provided by the open shutter, an electric lamp socket and a cable therefor adapted for connection to electrical terminals, and a reflecting shield carried by the lamp socket and shaped to fit into the open end of the sleeve and thus be removably supported thereby so as to be inserted therein or removed therefrom at will.

3. An illuminating device for ophthalmological apparatus comprising the combination of a universally jointed bracket having suitable mounting means at one end, a sleeve on the free end of the bracket to swing therewith and open at one end, an iris diaphragm in the other end of the sleeve, an adjustable focusing lens device including an inner tube removably secured in the said other end of the sleeve in axial relation thereto with its inner end within the iris diaphragm and an outer telescopic tube and an objective lens in the outer end of the latter tube, an electric lamp socket and a cable therefor adapted for connection to electrical terminals, and a reflecting shield carried by the lamp socket and shaped to fit into the open end of the sleeve and thus be removably supported thereby so as to be inserted therein or removed therefrom at will.

4. A convertible illuminating device for ophthalmological apparatus comprising the combination of a universally jointed bracket having suitable mounting means at one end, a sleeve on the free end of the bracket, a source of light in the sleeve, an iris diaphragm in one wall of the sleeve, and an adjustable focusing lens device including an inner tube removably secured in the said wall of the sleeve within the iris diaphragm and an outer telescopic tube and an objective lens in the outer end of the latter tube.

5. A convertible illuminating device for ophthalmological apparatus comprising the combination of a universally jointed bracket having suitable mounting means at one end, a light holding sleeve on the free end of the bracket, a condensing lens holder within the sleeve adjacent to one end and having an internally screw threaded outer portion, an iris diaphragm secured on the said end of the sleeve outside the condensing lens holder, and an adjustable focusing lens device including an inner tube adapted to screw into the screw threaded portion of the condensing lens holder and an outer telescopic tube and an objective lens in the outer end of the latter tube.

6. A convertible illuminating device for ophthalmological apparatus comprising the combination of a universally jointed bracket having suitable mounting means at one end, a light holding sleeve on the free end of the bracket, a condensing lens holder within the sleeve adjacent to one end and having an internally screw threaded outer portion, an iris diaphragm secured on the said end of the sleeve outside the condensing lens holder, an adjustable focusing lens device including an inner tube adapted to screw into the screw threaded portion of the condensing lens holder and an outer telescopic tube and an objective lens in the outer end of the latter tube, an electric lamp socket and a cable therefor adapted for connection to electrical terminals, and a reflecting shield carried by the lamp socket and shaped to fit into the other end of the sleeve and to be inserted therein and removed therefrom at will.

7. A convertible illuminating device for ophthalmological apparatus comprising the combination of an extensible bracket arm universally pivotally mounted at one end, a sleeve universally pivotally mounted on the free end of the bracket arm, to swing thereon and therewith and to be extended or retracted, an electric lamp socket, a cable leading therefrom for connection to a source of current supply, a socket-supporting shell member secured to the lamp socket and having removable telescopic relation with one end of the sleeve for thereby removably supporting a lamp within the sleeve, and an adjustable shutter carried by the other end of the sleeve for regulating the size of the light opening.

8. A convertible illuminating device for ophthalmological apparatus comprising the combination of an extensible bracket arm universally pivotally mounted at one end, a sleeve universally pivotally mounted on the free end of the bracket arm to swing thereon and therewith and to be extended or retracted, an electric lamp socket, a cable leading therefrom for connection to a source of current supply, a socket-supporting reflecting shield secured to the lamp socket and having removable telescopic relation with one end of the sleeve for thereby removably supporting the lamp socket on the sleeve, a condensing lens holder within the other end of the sleeve, and an adjustable shutter carried by the said other end of the sleeve outward from the condensing lens holder.

9. A convertible illuminating device for ophthalmological apparatus comprising the combination of a bracket arm universally pivotally mounted at one end, a sleeve universally pivotally mounted on the free end of the bracket arm to swing thereon and therewith, an electric lamp socket, a cable leading therefrom for connection to a source of current supply, a socket-supporting reflecting shield secured to the lamp socket and having removable telescopic relation with one end of the sleeve for thereby removably supporting the lamp socket thereon, a condensing lens holder within the other end of the sleeve, an iris diaphragm carried by the said other end of the sleeve outward from the condensing lens holder, and an adjustable focusing lens device including a tube of substantially smaller diameter than the sleeve removably secured at its inner end in the sleeve within the opening provided by the iris diaphragm.

10. A convertible illuminating device for ophthalmological apparatus comprising the combination of a bracket arm universally pivotally mounted at one end, a sleeve universally pivotally mounted on the free end of the bracket arm to swing thereon and therewith, an electric lamp socket, a cable leading therefrom for connection to a source of current supply, a socket-supporting reflecting shield secured to the lamp socket and having adjustable and removable telescopic relation with one end of the sleeve for thereby adjustably removably supporting the lamp socket on the sleeve, a condensing lens holder within the other end of the sleeve having a tubular portion of substantially smaller diameter than the sleeve, an iris diaphragm carried by the said other end of the sleeve outward from the condensing lens holder, and an adjustable focusing lens device removably carried by the sleeve including an inner tube removably secured in the said tubular portion of the condensing lens holder and an outer tube telescoping with the inner tube and an objective lens in the outer end of the latter tube.

11. A convertible illuminating device for ophthalmological apparatus comprising the combination of a bracket arm universally pivotally mounted at one end, a sleeve universally pivotally mounted on the bracket arm, a source of light within one end of the sleeve, a condensing lens holder within the other end of the sleeve, an iris diaphragm carried by the said other end of the sleeve outward from the condensing lens holder, and an adjustable focusing lens device including a tube of substantially smaller diameter than the sleeve removably secured at its inner end in the sleeve within the opening provided by the iris diaphragm.

In witness whereof, I hereunto subscribe my signature.

GILBERT S. DEY.